United States Patent Office 3,384,639
Patented May 21, 1968

3,384,639
METHOD FOR PRODUCING 3,6-DIOXO-2,5-DIMETHYLPIPERAZINE
Shinichi Ishida and Chihiro Oizumi, Tokyo, Japan, assignors to Asahi Kasei Kogyo Kabushiki Kaisha, Osaka, Japan, a corporation of Japan
No Drawing. Filed May 19, 1965, Ser. No. 457,192
Claims priority, application Japan, May 28, 1964, 39/29,840
8 Claims. (Cl. 260—268)

This invention relates to a method for producing 3,6-dioxo - 2,5 - dimethylpiperazine (anhydride of alpha-alanine).

It is known to produce dioxopiperazines from a simple amino acid such as alpha-alanine anhydride, by a method comprising reacting the methyl or ethyl ester of an amino acid in alcohol in the presence of ammonia (E. Fischer, U. Suzuki, Ber., 38, 4173 (1905)). Another known method comprises heating an amino acid directly in ethylene glycol or glycerine. Still another method starts from a dipeptide derivative such as dipeptide ester or azide. From a commercial viewpoint, the method of heating amino acid directly in ethylene glycol, glycerine or the like is preferred. C. Sannie obtained alanine anhydride by heating alanine in ethylene glycol with a yield of 70 percent (C. Sannie, Bull. Soc. Chim. Biol., 9, 487 (1942)). Since this method is simple and produces a good yield, it has been widely used as a method of producing dioxopiperazines from simple amino acids. However, the yield is approximately in the range of 60 to 70 percent and yields of more than 90 percent cannot be achieved. From the fact that the crude product of the Sannie process is biuret reaction-positive, it is clear that there occurs a simultaneous, competing reaction producing linear polymers along with that producing cyclic anhydride (dioxopiperazine).

that the prior art processes proceed without the use of a catalyst, whereas the present process requires a catalyst, and will not proceed in the absence of a catalyst.

The catalyst used here includes, for example, phosphoric acid, phosphoric anhydride, hydrochloric acid, hydrobromic acid, sulfuric acid, nitric acid, boric acid, chloric acid and other general inorganic acids having a pKa of less than 4. Further, among organic acids those having a pKa of less than 4, for example, sulfonic acids such as benzene sulfonic acid, toluene sulfonic acid and the like, dichloroacetic acid, trichloroacetic acid, trifluoroacetic acid, picric acid, acetylene dicarboxylic acid, chlorofumaric acid, and maleic acid are useful. Among these inorganic acids, nitric acid, in reality, brings about the nitration of phenol, hence the yield of dioxopiperazine is not so good. In the case of sulfuric acid, the reaction product of phenol and sulfuric acid is a sulfonic acid which indicates strong acidity and therefore, this acid is useful. However, among the acids, anhydrous phosphoric acid, phosphoric acid, or hydrochloric acid are convenient in practical applications. These acids can be used as such, or as a salt of alanine such as alanine hydrochloride or alanine sulfate. Hydrochloric acid may be used in the form of hydrogen chloride gas. It is also possible to add a solvent to the reaction system consisting of alanine, acidic catalyst and phenol (or its nuclear substitute) to effect the reaction. In such cases, the reaction solvent is not indispensable but its addition makes the reaction proceed smoothly. Any solvent is useful so long as it has a boiling point higher than 60° C., is immiscible with water, and does not react with alanine, phenol or its nuclear substitute, acidic catalyst and the like. For practical purposes the solvent may be selected from aromatic hydrocarbons such as benzene, toluene, xylene, ethyl benzene, propyl benzene, cumene, cymene and the like, halo-

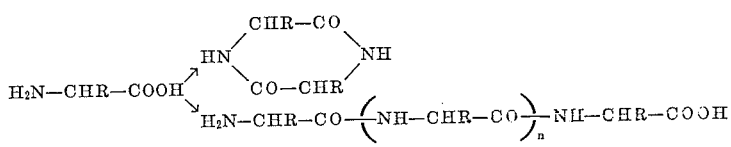

Thus even by the method heretofore considered to be most effective, commercialization involves difficulty with respect to yield.

After studying methods for producing the corresponding dioxopiperazine from alanine, we have found a method for producing dioxopiperazine of high purity and in high yield. According to the present invention, 3,6-dioxo-2,5-dimethylpiperazine of high purity is readily produced in high yield by heating alanine with at least an equivalent weight based on alanine of phenol or a nuclear substituted phenol and an acidic catalyst in the presence or absence of solvent. It is preferred to conduct the reaction at a temperature above 100° C.

The alanine used here includes any of the optically active forms and the optically inactive forms.

The phenol or its nuclear substitute used here includes phenol, o-, m-, and p-cresol, mixtures thereof, nuclear halogen substitutes of phenol such as o-, m-, and p-chlorophenol, o-, m-, and p-bromophenol, nuclear nitro substitutes of phenol and nuclear cyano substitutes of phenol. Since phenol itself is most economical and reactive and produces a high yield it is the most important for commercial use.

A distinguishing characteristic of the present process over the prior art processes which employ aliphatic polyhydric alcohols such as ethylene glycol, or glycerine, is genated hydrocarbons such as carbon tetrachloride, chloroform, ethylene chloride, tetrachloroethane, trichloroethylene, monochlorobenzene and the like, and esters such as ethyl acetate, propyl acetate, butyl acetate, ethyl benzoate and the like. When these solvents are used in the reaction, the reaction temperature must be above 60° C. It is believed that addition of these solvents promotes the reaction by removing the water produced in the form of an azeotropic mixture. Thus highly pure 3,6-dioxo 2,5-dimethyl piperazine is readily produced in high yield by heating alanine with phenol or its nuclear substituted derivative and in the presence of an acidic catalyst with or without a solvent. For example, from DL-alanine, it is easy to achieve a yield of the corresponding dioxopiperazine in excess of 95 percent. The crude reaction product obtained by this method does not show a positive biuret reaction, indicating the absence of the side reaction producing linear polymers. These points are believed to be the advantage which substantially distinguishes the present process over prior art.

The present invention may be more fully understood from the following examples which are offered by way of illustration and not by way of limitation. It is to be understood that many variations and modifications can be made in the details without departing from the nature and spirit of the invention.

EXAMPLE 1

Ten g. DL-alanine, and 30 g. phenol were charged in a 100 cc. flask. Nine cc. xylene and about 0.1 g. phosphorus pentoxide were added thereto. The flask was connected to a common esterification apparatus and heated under reflux. Water was gradually separated, and amino acid gradually dissolved in the reaction mixture with the advancement of reaction. The alanine completely dissolved and the formation of water finished in about 8 hours whereby a pale brown, transparent reaction solution was obtained. This reaction solution was heated on a water bath at a temperature of 80° C. in vacuo to distill off xylene and phenol. The precipitate obtained by adding acetone to the distillation residue, was filtered, washed with acetone and dried whereby 7.1 g. white powder crystal; M.P. 271° C. (not corrected), was yielded (89% of the theoretical value). Infrared spectra of this material were identical to those of DL-alanine diketopiperazine separately synthesized, and the biuret reaction was negative. After concentration, phenol was distilled off and acetone was added whereby powder crystal slightly colored in yellowish brown; M.P. 268° to 271° C., was obtained. Infrared spectra were the same as in the above-mentioned crystal and the biuret reaction was also negative. The yield of this portion was 0.6 g. (7.5 percent of the theoretical value) and the total yield amounted to 7.7 g. (96.5 percent of the theoretical value).

EXAMPLE 2

In a 100 cc. flask, were charged 10 g. DL-alanine and 50 g. phenol and about 0.1 g. phosphorus pentoxide was added. The temperature was maintained at 140° C. during the reaction while passing the nitrogen gas. The alanine which had not been in dissolved state, dissolved gradually and in 11 hours, was found to be in completely dissolved state. The reaction solution treated as in Example 1, yielded 7.3 g. DL-alanine (91.5 percent of theoretical value). This substance was negative in the biuret reaction and showed the same infrared spectra as in Example 1.

EXAMPLE 3

Fourteen g. hydrochloric acid salt of DL-alanine was charged in a 100 cc. flask together with 30 g. phenol and 10 cc. xylene. The flask was connected to a common esterification apparatus and heated under reflux. By the reaction which happened with considerable violence while liberating water, the hydrochloric acid salt of alanine dissolved in the reaction solution. In 5 to 6 hours, the reaction completed and yielded light brown transparent reaction solution. The treatment carried out as in Example 1 produced white powder crystal of DL-alanine anhydride with a yield of 6.7 g. (84 percent of the theoretical value); M.P. 271° C. (not corrected). Its infra-red spectra were identical to those of a standard product and its biuret reaction was negative.

EXAMPLE 4

Ten g. DL-alanine was introduced in a 100 cc. flask together with 30 g. phenol and 100 cc. xylene and 0.04 cc. of 98 percent sulfuric acid was added thereto. The flask was connected to a common esterification apparatus and heated and refluxed. The alanine dissolved in about 10 hours. The resulting pale brown reaction solution yielded 6.4 g. alanine anhydride after the same treatment as in Example 1. The infrared spectra were the same as in Example 1 and the biuret reaction was negative.

EXAMPLE 5

Ten g. L-alanine was introduced, together with 30 g. phenol and 9 cc. xylene, in a 100 cc. flask connected to an esterification apparatus and after the addition of about 0.1 g. of phosphorus pentoxide, the flask was heated under reflux. The reaction proceeded gradually, liberating water and alanine dissolved in the reaction solution. In about 15 hours, L-alanine dissolved completely, yielding a light brown transparent reaction solution. This solution was poured into about 100 cc. acetone, and the diketopiperazine compound which precipitated out in the form of white powdery crystals was filtered and washed with actone. This was identified as L-alanine anhydride by comparing its infrared spectra with that of a standard sample. The yield was 5.6 g. (78.6 percent of the theoretical value) M.P. was 290° C. (not corrected) and the biuret reaction was negative.

EXAMPLE 6

Ten g. DL-alanine was suspended in 40 cc. m-cresol, and a small amount of phosphorous pentoxide was added thereto.

The mixture was charged, together with 10 cc. xylene, in a 100 cc. flask connected to an esterification apparatus and heated under reflux. The solution gradually turned to reddish-brown and alanine dissolved. After about 16 hours, a small amount of undissolved alanine was filtered off and the filtrate was added to 100 cc. acetone. The resulting diketopiperazine compound (yield of 4.5 g. 63 percent of the theoretical value) showed the same properties as in Example 1.

EXAMPLE 7

To 10 g. DL-alanine and 50 g. p-chlorophenol, were added 0.5 g. p-toluene sulfonic acid and 5 cc. 1,1,2,2-tetrachloroethane and the mixture was heated under reflux as in Example 1. Though the solution showed reddish brown color, it gradually dissolved alanine as in Example 1 and solution was almost complete in about 15 hours. The resulting reaction solution yielded 7.4 g. (93 percent of the theoretical value) after the same treatment as in Example 1. The infrared spectra and the biuret reaction were the same as in Example 1.

EXAMPLE 8

Ten g. DL-alanine and 50 g. p-nitrophenol were placed in a 100 cc. flask and 10 cc. xylene and 0.1 g. phosphorus pentoxide were added thereto. The heating under reflux was carried out as in Example 1. Water was produced suddenly and violently and amino acid dissolved in about 8 hours after which the formation of water was completed. The reaction product was dissolved in 150 cc. ether and the precipitated crystals were filtered whereby a yield of 7.7 g. (96 percent of the theoretical value) was obtained. The infrared spectra and the biuret reaction were the same as in Example 1.

What is claimed is:

1. A process for producing 3,6-dioxo, 2,5-dimethyl piperazine which comprises heating a salt of alanine with an organic or inorganic acid having a pKa less than 4 with a phenol of the general formula:

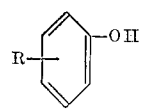

wherein R is selected from the group consisting of hydrogen, methyl, halogen, and nitro, said phenol being present in an amount by weight at least equal to that of the alanine salt.

2. A process as claimed in claim 1 wherein the salt is the hydrochloride or the sulfate.

3. A process as claimed in claim 1 wherein the alanine salt and the phenol are placed in a water immiscible organic solvent, said solvent being inert to the amino acid and the phenol.

4. A process as claimed in claim 1 wherein the heating is carried out at a temperature above 60° C.

5. A process for producing 3,6-dioxo, 2,5-dimethyl piperazine which comprises heating alanine with a phenol of the general formula:

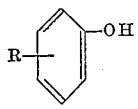

wherein R is selected from the group consisting of hydrogen, methyl, halogen, and nitro, said phenol being present in an amount by weight at least equal to that of the alanine, and an acidic catalyst of pKa less than 4.

6. A process as claimed in claim 5 wherein the alanine, the phenol, and the catalyst are placed in a water immiscible organic solvent, said solvent being inert to the alanine, the phenol, and the catalyst.

7. A process as claimed in claim 5 wherein the heating is carried out at a temperature above 60° C.

8. A process as claimed in claim 5 wherein said catalyst is present in an amount less than 52.3 mol. percent based on alanine.

References Cited

Li: Chemical Abstracts, vol. 44 (1950), column 3896g.

HENRY R. JILES, *Primary Examiner.*

R. BOYD, *Assistant Examiner.*